3,157,315
COMBINATION SALT AND PEPPER SHAKER
Elmo Bianco, 42 Seymour St., Torrington, Conn.
Filed Dec. 11, 1962, Ser. No. 243,855
4 Claims. (Cl. 222—142.5)

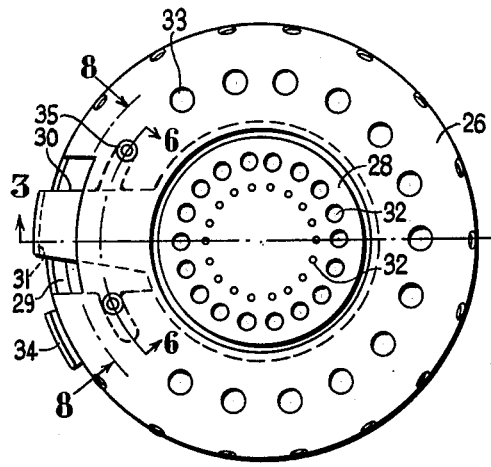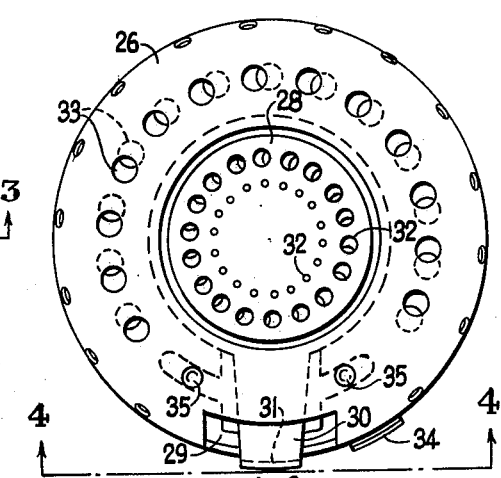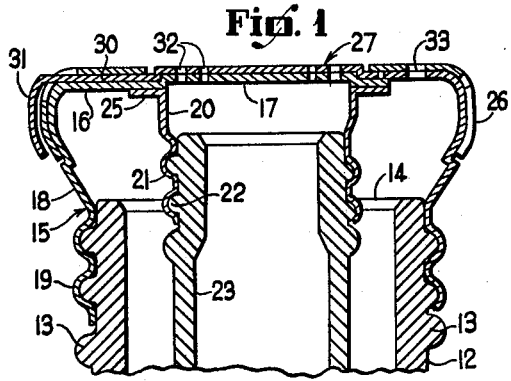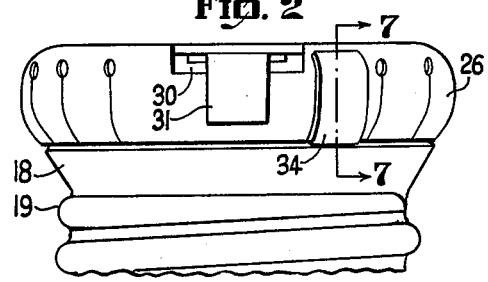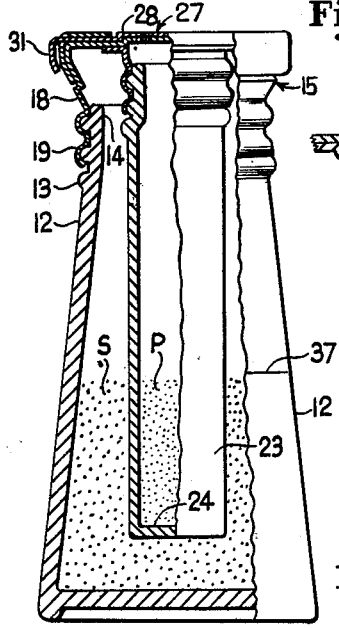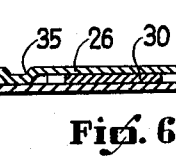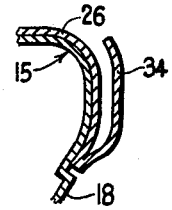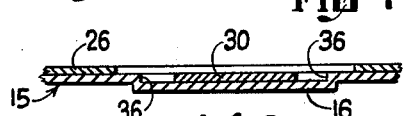
INVENTOR
*Elmo Bianco.*

United States Patent Office 3,157,315
Patented Nov. 17, 1964

This invention relates to an implement used in the culinary art, and more particularly to a container for salt and pepper.

While cooks have often expressed a desire for a single container for salt and pepper, in order to speed up their work in large kitchens where speed is essential in the preparation of a large number of meals in a minimum of time, no one has apparently done anything about it in a constructive way that has led to any mass production of a practical device for this purpose.

It is, therefore, the main object of this invention to provide a practical combination salt and pepper shaker that is fool proof in its use and will not fail to function when needed.

Another object of this invention is to provide a combination salt and pepper shaker having outlets separately adjustable for either salt or pepper, or the combination of the two, according to one's individual needs or desires.

Another object of this invention is to provide a combination salt and pepper shaker that can readily be filled with either salt or pepper without any danger of the two ingredients becoming accidently mixed.

Another object of this invention is to provide a combination salt and pepper shaker having a minimum of structure, none of which is complicated and apt to break under normal handling.

Another object of this invention is to provide a combination salt and pepper shaker that can be mass produced in any size, and from any material.

Still another object of this invention is to provide a combination salt and pepper shaker that can quickly be disassembled or assembled for the filling of either container without the necessity of filling the other section of the container.

Other and further objects and advantages of this combination salt and pepper shaker will be hereinafter described, and the novel features thereof defined in the appended claims.

Referring to the drawing:

FIGURE 1 is a top view of this invention with the top adjusted to the full open position for the shaking of salt and pepper from the same.

FIGURE 2 is a top view of this invention with the top adjusted to a partly open position for the shaking of a minimum amount of salt and pepper.

FIGURE 3 is a sectional view of this invention taken substantially along line 3—3 of FIGURE 1, as viewed in the direction indicated by the arrows.

FIGURE 4 is a side view of the top of this invention in the same position as indicated in FIGURE 2.

FIGURE 5 is a side view of this invention in its entirety. The external and internal chamber is partly broken open in order to show the interior.

FIGURE 6 is a sectional view of this invention taken substantially along line 6—6 of FIGURE 1, as viewed in the direction indicated by the arrows.

FIGURE 7, a sectional view of this invention taken substantially along line 7—7 of FIGURE 4, is viewed in the direction indicated by the arrows.

FIGURE 8 is a sectional view of this invention taken substantially along line 8—8 of FIGURE 1, as viewed in the direction indicated by the arrows.

Similar reference characters refer to similar parts throughout the several views of the drawing.

Having reference to the drawing in detail, there is generally indicated by the character 12, a salt container having externally rolled threads 13, on the upper end of 14, as clearly shown in FIGURES 3 and 5 of the accompanying drawing. In these figures it is also seen that the top indicated in its entirety by the reference numeral 15, and arrowed lead line, includes a flat outer portion 16 and flat raised inner portion 17, both of which are provided with a plurality of openings to be described in some detail later in this specification.

The aforesaid top 15, is of a greater diameter than that of the upper end 14 of the container 12, and is provided with inwardly sloping sides 18, which have their lower portion formed into rolled threads 19, that mate with the aforesaid externally rolled threads 13, of the container 12, when the top is screwed in place.

A tubular inner member 20, has externally rolled threads 21, formed in the lower portion that mate with the externally rolled threads 22 on the upper end of the pepper container 23, which is cylindrical in form, and which has a closed bottom 24. The upper end of the tubular member 20, terminates in an external flange 25, which is spot welded, or otherwise secured to the underside of the top 15, at a point where the flat outer portion 16, raises to form the raised portion 17 of the aforesaid top 15. A shell 26, which I personally call a salt adjusting knob, is provided with a centrally located circular opening, through which projects the pepper adjusting knob 27, that embodies a raised circular portion 28, adapted to rotatably fit over the raised center portion 17, of the top 15. The aforesaid shell 26, is provided with an elongated opening 29, that has a top view configuration of a circular ring sector, through which is slidably located a tongue 30, that is an extension of the aforesaid pepper adjusting knob 27. The outer edge of the aforesaid shell 26 is curved both downwardly and slightly inwardly to fit the contour of the aforesaid sloping sides 18 of the top 15, and the aforesaid tongue 30, has its outer end also curved both downwardly and slightly inwardly to fit the contour of the aforesaid outer edge of the shell 26, over which it, the outer end of the tongue, overlaps as best shown in FIGURE 3 of the appended drawing.

The outer end of the tongue 30 is actually a tab, and is characterized in the drawing by the reference numeral 31.

It has been previously stated that the top of this invention is provided with a plurality of openings. These openings are obviously for the release of the salt and pepper that is placed in the two containers that go to make the basic parts of this novel invention.

Looking once again at FIGURES 1 and 2 of the appended drawing, it will be seen that both the raised center portion 17 of the top 15, and the raised circular portion 28 of the pepper adjusting knob 27, contain a plurality of openings 32, that are in a mating position when the tab 31 is moved so that the outer end of the tab 30 is in a center or opening position in the aforesaid elongated opening 29. The moving of the tab 31 will disengage the openings 32, in the raised circular portion 28 of the pepper adjusting knob 27, from the openings having the same reference number in the raised center portion 17 of the top 15. The openings in the two different parts of this invention are characterized by the same number for reasons of clarity, since they must be in alignment before the pepper can be shaken out of its container 23. The plurality of openings 32 can be of any desired pattern, the preferred one is circular with one row of openings slightly larger than the other row.

Both the shell (salt adjusting knob) 26, and the flat outer portion 16 of the top 15, are provided with a plurality of openings 33, for the release of salt placed within its container 12. The openings, which can be in any desired pattern, any desired shape, and/or any desired diameter, are in full alignment when the shell 26 (salt adjusting knob) is rotated until the openings in each one of the aforesaid members are in alignment with one another. The rotation of the shell 26 is best performed by means of the rectangular tab 34, which has its lower end secured to a portion of the side of shell 26. This aforesaid tab 34 may be integral with the shell 26 if so desired.

The amount of radial movement, of the salt adjusting knob 26, is controlled by the location of the two circular indentations 35 in the shell 26 (salt adjusting knob) and the arcuate depression in flat outer portion 16, as clearly shown in FIGURES 1 and 6, while the amount of radial movement of the pepper adjusting knob 27 is limited in turn by the change in the level of the flat outer portion 16 at the two points indicated by the reference numeral 36 in FIGURE 8 of the appended drawing.

This invention in its present form is constructed from two different materials. The salt container 12, and the pepper container 23, are manufactured from glass. The top 15, and all of its associated members as well as the tubular inner member 20, are constructed from stainless steel, and the invention can be manufactured from any desired material. When the salt and pepper containers are of clear glass, a fill line 37 is engraved or otherwise placed on the outside of the aforesaid salt container 12 at any desired location, in order to provide one with an indication of how much salt and pepper to place in the containers.

It will be obvious from the foregoing that an exceedingly simple and efficient combination salt and pepper shaker has been disclosed, wherein both salt and pepper indicated by the reference letters "S" and "P" in FIGURE 5 of the appended drawing, may be dispensed either singly or together in any desired portions merely by moving the tab 31 that controls the pepper, and/or by moving the rectangular tab 34, that is part of the salt adjusting knob 26.

While the preferred form of the invention has been herein shown and described it is to be understood that various changes may be made in the details of construction and in the shape, combination and arrangement of the several parts, within the scope of the claims, without departing from the spirit of this invention.

What is claimed as new is:

1. A combination salt and pepper shaker, comprising, a salt container which is circular when viewed from above and has an open end, a top having a cylindrical portion to fit over the open end of the salt container, means to secure the cylindrical portion to the salt container, the top being enlarged above the cylindrical portion and terminating in a closure portion, a disc which is smaller than the closure portion, which is over the center of the closure portion in contact therewith, a tongue extending radially from said disc along said closure portion and terminating in a downward extending tab, a shell having a marginal flange, the flange extending downward and slightly inward so that the shell fits over the top with the flange gripping the enlarged portion of the top, the shell having a central, circular aperture which is slightly smaller than the disc and an aperture in its flange to accommodate the tongue, a plurality of apertures in the shell and in the closure which are positioned to be brought into and out of registry by rotation of the shell, a plurality of openings in the disc and closure which can be brought into and out of registry by rotating the disc, a pepper container which is circular when viewed from its top and substantially the same diameter as the disc, and means to secure the open end of the pepper container to the underside of the closure beneath the disc.

2. The combination of claim 1 in which the closure portion is substantially flat.

3. The combination of claim 1 in which a tab is secured to the shell to assist in rotating the shell.

4. The combination of claim 1 in which the closure portion has a central raised portion and the disc has a central raised portion to fit the aforementioned central raised portion.

References Cited by the Examiner

UNITED STATES PATENTS

| 150,113 | 4/74 | Vom Hofe | 222—158 X |
| 1,086,943 | 2/14 | Sehorn | 222—142.5 |
| 2,200,755 | 5/40 | McArthur | 222—142.5 |

FOREIGN PATENTS

| 344,573 | 9/04 | France. | |

LOUIS J. DEMBO, *Primary Examiner.*

EUGENE F. BLANCHARD, *Examiner.*